US008031374B2

(12) United States Patent
Ohkubo et al.

(10) Patent No.: US 8,031,374 B2
(45) Date of Patent: Oct. 4, 2011

(54) THERMAL RECORDING DEVICE, IMAGE FORMING METHOD AND PRINTED MATTER

(75) Inventors: Takayuki Ohkubo, Tokyo (JP); Kenichi Aso, Tokyo (JP); Yoshihiko Tamura, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 366 days.

(21) Appl. No.: 12/294,280

(22) PCT Filed: Mar. 28, 2007

(86) PCT No.: PCT/JP2007/056602
§ 371 (c)(1),
(2), (4) Date: Sep. 24, 2008

(87) PCT Pub. No.: WO2007/114147
PCT Pub. Date: Oct. 11, 2007

(65) Prior Publication Data

US 2009/0161166 A1 Jun. 25, 2009

(30) Foreign Application Priority Data

Mar. 31, 2006 (JP) ................................ 2006-096523
Mar. 31, 2006 (JP) ................................ 2006-096544

(51) Int. Cl.
*B41J 2/00* (2006.01)
*G06K 15/00* (2006.01)

(52) U.S. Cl. ....... 358/3.07; 347/188; 347/191; 101/483; 283/117

(58) Field of Classification Search ................ 358/3.07, 358/1.18
See application file for complete search history.

(56) References Cited

U.S. PATENT DOCUMENTS

2003/0053120 A1 3/2003 Ito
2006/0033801 A1 2/2006 Yun

FOREIGN PATENT DOCUMENTS

| | | |
|---|---|---|
| EP | 0 260 917 | 3/1988 |
| JP | 6-202445 | 7/1994 |
| JP | 2000-135810 | 5/2000 |
| JP | 2002-221781 | 8/2002 |
| JP | 2002-304632 | 10/2002 |
| JP | 2005-280302 | 10/2005 |

OTHER PUBLICATIONS

Extended European Search Report issued in European Application No. 07740040.6 on May 27, 2010.

(Continued)

*Primary Examiner* — Twyler Haskins
*Assistant Examiner* — Christopher D Wait
(74) *Attorney, Agent, or Firm* — Antonelli, Terry, Stout & Kraus, LLP.

(57) ABSTRACT

A control section 9 of a thermal printer 1 performs CMYK/RGB-gray conversion, gradation conversion, halftone conversion for an input image data 3, and performs shift processing and rotation processing in accordance with the resolution and the number of lines of the thermal printer 1. The control section 9 performs heat-accumulation correction processing for the image data subjected to the halftone processing, and the image data subjected to the shift processing and the rotation processing, and then prints a hairline image. When a circular hairline is printed, the control section 9 defines a pattern of circular hairlines, and produces a horizontal hairline pattern. Further, the control section 9 shifts the produced horizontal hairline pattern downward to thereby produce another horizontal hairline pattern, performs polar coordinate conversion for the produced horizontal hairline patterns to thereby produce two circular hairlines, performs the heat-accumulation correction processing for the two produced circular hairlines, and prints them.

27 Claims, 16 Drawing Sheets

OTHER PUBLICATIONS

Extended European Search Report issued in European Application No. 10014987.1 on Feb. 23, 2011.

PCT Written Opinion on PCT International Application No. PCT/JP2007/056602 on Oct. 30, 2008.

International Search Report issued in International Application No. PCT/JP2007/056602 on Jun. 26, 2007.

PATTERN IMAGE G11

HORIZONTAL HAIRLINE PATTERN IMAGE G12

HORIZONTAL HAIRLINE PATTERN IMAGE G13

CIRCULAR HAIRLINES G14

THERMAL RECORDING DEVICE, IMAGE FORMING METHOD AND PRINTED MATTER

TECHNICAL FIELD

The present invention relates to a thermal recording apparatus or the like which reduces effects of heat accumulated in a thermal head and prints highly fine hairline images and circular hairlines by a low resolution.

BACKGROUND ART

A thermal printer is an apparatus which heats the back of an ink ribbon superimposed on a recording paper by means of a thermal head in order to thermally transfer the ink of the ink ribbon onto the recording paper, to thereby print an image on the paper. The ink ribbon is a thermal transfer sheet including a layer of thermally meltable color ink, and the recording paper is an image-receiving sheet such as a sheet of paper or a plastic sheet.

The thermal head is a composed of a plurality of heat-generating resistors formed on a substrate in a row. The thermal printer includes a plurality of ink ribbons corresponding to a plurality of colors. The inks of the ink ribbons of the plurality of colors are transferred in a superimposed state onto the recording paper at the same position, to thereby perform color printing. For example, the ink ribbons are disposed to be rotatable, and an ink ribbon to undergo thermal transfer is moved to the position of the thermal head. Further, a recording-paper feed apparatus feeds the recording paper to the position of the thermal head, which is a printing position, whereby printing is effected in a predetermined image-printing area of the recording paper.

There have been known various methods for forming a hairline pattern, which is a pattern composed of a large number of thin lines (hairlines) extending along a specific direction. A method for consistently obtaining a clear hairline pattern has been known (see, for example, Patent Document 1). In this method, hairlines and hairline gaps are arranged on a drawing line of interest; a determination is made as to whether the hairline gaps arranged on the drawing line of interest are adjacent to the hairline gaps of a determined drawing line on which hairlines and hairline gaps have already been arranged; the drawing line of interest is treated as a determined drawing line only when none of the hairline gaps of the drawing line of interest is located adjacent to the hairline gaps of the determined drawing line; and the generation and arrangement of hairlines and hairline gaps for the drawing line of interest are performed once more when any of the hairline gaps of the drawing line of interest is located adjacent to the hairline gaps of the determined drawing line.

There have been known various methods for forming a circular hairline. However, when a fine circular hairline is formed, a moiré, which is a periodic striped pattern, is generated.

There has been known a method for preventing periodic image disturbances, such as moiré and pitch variation, from being emphasized when a plurality of colors are superimposed (see, for example, Patent Document 2). The method is used in an image forming apparatus which forms a color image by repeating an image forming process including a step of applying an oscillating voltage to an electrifier so as to charge an image bearing body. According to the method, the frequency of the oscillating voltage applied to the electrifier is shifted each time the image forming process is repeated, whereby the periodic image disturbances are prevented from being emphasized.

Patent Document 1: Japanese Patent Application Laid-Open (kokai) No. 2002-221781

Patent Document 2: Japanese Patent Application Laid-Open (kokai) No. H6-202445

DISCLOSURE OF THE INVENTION

Problems to be Solved by the Invention

However, the above-described first method requires complicated calculation for formation of hairlines.

Further, the above-described second method is peculiar to an image forming apparatus which forms a color image, in a transfer scheme or a direct scheme, by repeating an image forming process including a step (primary charging) of uniformly charging an image bearing body such as a photosensitive body or a dielectric body. Therefore, the second method cannot be applied to a thermal recording apparatus or the like.

The present invention has been accomplished in view of such problems, and an object of the present invention is to provide a thermal recording apparatus or the like which reduces effects of heat accumulated in a thermal head and prints highly fine hairline images and circular hairlines by a low resolution.

Means for Solving the Problems

A first invention for achieving the above-described object is a printed matter obtained by performing shift processing for second image data, which are obtained from first image data through gradation conversion and halftone conversion, to thereby produce third image data; performing rotation processing for said third image data to thereby produce fourth image data; performing heat-accumulation correction processing for said third image data and said fourth image data to thereby produce fifth image data and sixth image data; and printing the fifth image data and the sixth image data on an object to be printed by a thermal recording apparatus including a thermal head.

An original image which is obtained from a read image through CMYK/RGB-gray conversion, gradation conversion, and halftone conversion, is shifted rightward and rotated by 180 degrees to thereby obtain a second image; and the original image and the second image are subjected to the heat-accumulation correction processing and are printed such that the original image and the second image are superimposed on each other. Thus, finer hairlines can be printed at a low resolution.

A second invention is a thermal recording apparatus comprising means for performing shift processing for second image data, which are obtained from first image data through gradation conversion and halftone conversion, to thereby produce third image data; means for performing rotation processing for said third image data to thereby produce fourth image data; means for performing heat-accumulation correction processing for said third image data and said fourth image data to thereby produce fifth image data and sixth image data; and means for printing the fifth image data and the sixth image data on an object to be printed.

A third invention is an image forming method comprising the steps of performing shift processing for second image data, which are obtained from first image data through gradation conversion and halftone conversion, to thereby produce third image data; performing rotation processing for said third image data to thereby produce fourth image data; performing heat-accumulation correction processing for said third image data and said fourth image data to thereby produce fifth image data and sixth image data; and printing the fifth image data and the sixth image data on an object to be printed by a thermal recording apparatus including a thermal head.

A fourth invention is a printed matter obtained by producing first image data for forming a pattern; producing, from said first image data, second image data for forming a second pattern; performing shift processing for said second image data to thereby produce third image data; performing polar coordinate conversion for said second image data and said third image data to thereby produce fourth image data and fifth image data; performing heat-accumulation correction processing for said fourth image data and said fifth image data to thereby produce sixth image data and seventh image data; and printing said sixth image data and said seventh image data on an object to be printed by a thermal recording apparatus including a thermal head.

A horizontal hairline pattern is produced by performing pattern definition, and another horizontal hairline pattern is produced by shifting the horizontal hairline pattern downward. Two circular hairlines are produced from these horizontal hairline patterns through polar coordinate conversion and combined together, whereby moiré can be reduced, and finer circular hairlines are produced.

A fifth invention is a thermal recording apparatus comprising means for producing first image data for forming a pattern; means producing, from said first image data, second image data for forming a second pattern; means for performing shift processing for said second image data to thereby produce third image data; means for performing polar coordinate conversion for said second image data and said third image data to thereby produce fourth image data and fifth image data; means for performing heat-accumulation correction processing for said fourth image data and said fifth image data to thereby produce sixth image data and seventh image data; and means for printing said sixth image data and said seventh image data on an object to be printed.

A sixth invention is an image forming method comprising the steps of producing first image data for forming a pattern; producing, from said first image data, second image data for forming a second pattern; performing shift processing for said second image data to thereby produce third image data; performing polar coordinate conversion for said second image data and said third image data to thereby produce fourth image data and fifth image data; performing heat-accumulation correction processing for said fourth image data and said fifth image data to thereby produce sixth image data and seventh image data; and printing said sixth image data and said seventh image data on an object to be printed by a thermal recording apparatus including a thermal head.

A seventh invention is a printed matter obtained by producing first image data for forming a pattern; producing, from said first image data, second image data for forming a second pattern; performing polar coordinate conversion for said second image data to thereby produce third image data; performing heat-accumulation correction processing for said third image data to thereby produce fourth image data; and printing said fourth image data on an object to be printed by a thermal recording apparatus including a thermal head.

An eighth invention is a thermal recording apparatus comprising means for producing first image data for forming a pattern; means for producing, from said first image data, second image data for forming a second pattern; means for performing polar coordinate conversion for said second image data to thereby produce third image data; means for performing heat-accumulation correction processing for said third image data to thereby produce fourth image data; and means for printing said fourth image data on an object to be printed.

A ninth invention is an image forming method comprising the steps of producing first image data for forming a pattern; producing, from said first image data, second image data for forming a second pattern; performing polar coordinate conversion for said second image data to thereby produce third image data; performing heat-accumulation correction processing for said third image data to thereby produce fourth image data; and printing said fourth image data on an object to be printed by a thermal recording apparatus including a thermal head.

A tenth invention is a printed matter obtained by performing polar coordinate conversion for second image data, which are obtained from first image data through gradation conversion and halftone conversion, to thereby produce third image data; performing heat-accumulation correction processing for said third image data to thereby produce fourth image data; and printing said fourth image data on an object to be printed by a thermal recording apparatus including a thermal head.

An eleventh invention is a thermal recording apparatus comprising means for performing polar coordinate conversion for second image data, which are obtained from first image data through gradation conversion and halftone conversion, to thereby produce third image data; means for performing heat-accumulation correction processing for said third image data to thereby produce fourth image data; and means for printing said fourth image data on an object to be printed.

A twelfth invention is an image forming method comprising the steps of performing polar coordinate conversion for second image data, which are obtained from first image data through gradation conversion and halftone conversion, to thereby produce third image data; performing heat-accumulation correction processing for said third image data to thereby produce fourth image data; and printing said fourth image data on an object to be printed by a thermal recording apparatus including a thermal head.

Effects of the invention

According to the present invention, it is possible to provide a thermal recording apparatus or the like which reduces effects of heat accumulated in a thermal head and prints highly fine hairline images and circular hairlines by a low resolution.

DESCRIPTION OF REFERENCE NUMERALS

Figure 1:
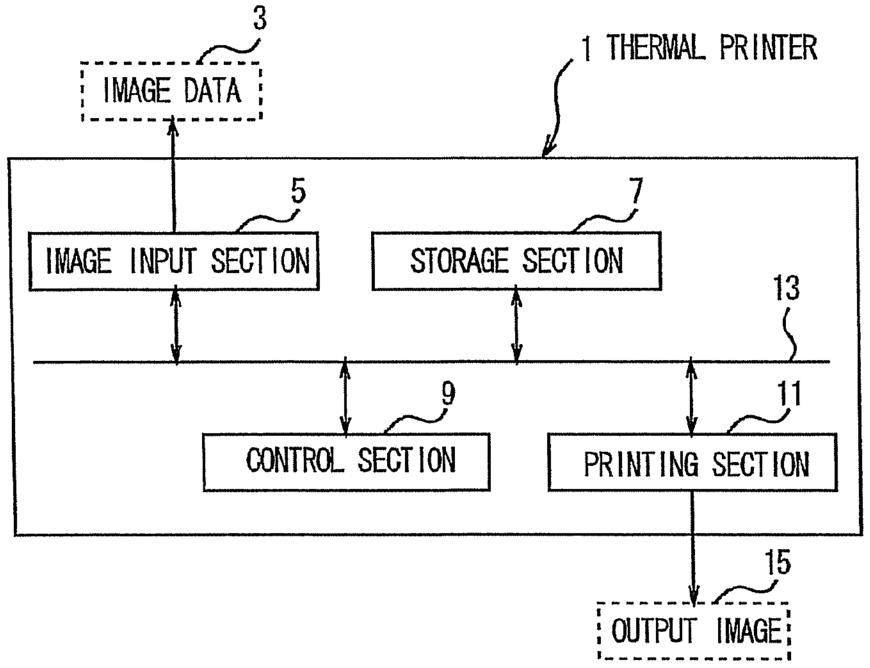
FIG. 1 Diagram showing the configuration of a thermal printer 1.

1 . . . thermal printer
3 . . . image data
5 . . . image input section
7 . . . storage section
9 . . . control section
11 . . . printing section
13 . . . bus
15 . . . output images
21 . . . image reading
23 . . . image processing
25 . . . image printing
27 . . . image memory
29 . . . processing parameter

BEST MODE FOR CARRYING OUT THE INVENTION

A first preferred embodiment of a thermal recording apparatus, etc. according to the present invention will next be described in detail with reference to the attached drawings.

Configuration and Function of the Thermal Recording Apparatus)

First, the configuration of the thermal recording apparatus (thermal printer 1) of the embodiment of the present invention will be described with reference to FIG. 1.

FIG. 1 is a diagram showing the configuration of the thermal printer 1.

As shown in FIG. 1, the thermal printer 1 is an apparatus which heats the back of an ink ribbon (not shown) superimposed on a recording paper (not shown) by means of a thermal head (not shown) in order to thermally transfer the ink of the ink ribbon onto the recording paper, to thereby print an image on the paper. The thermal printer 1 includes an image input section 5, a storage section 7, a control section 9, a printing section 11, etc. which are connected together via a bus 13.

Image data 3 to be printed are input to the image input section 5. The storage section 7 stores the input image data 3, data to be temporarily stored in the course of calculation, processed image data, parameters for image processing, etc. The control section 9 is composed of a CPU (central processing unit) which executes programs, and memory such as ROM (read only memory), RAM (random access memory), etc. for storing program instruction, data, etc. The control section 9 instructs the image input section 5 to read the image data 3 or process the image data 3, sends processed image data to the printing section 11, and instructs the printing section 11 to print the image data.

Although not illustrated, the printing section 11 is composed of a thermal head including a plurality of heat-generating resistors formed in a row on a substrate; a thermal head drive section; etc. Upon receipt of image data to be printed and an instruction from the control section 9, the printing section 11 applies to the thermal head energy corresponding to each pixel value. Thus, ink at the energy-applied portion melts and adheres to recording paper, whereby an output image 15 is output. The greater the pixel value, the greater the image recording density; and the smaller the pixel value, the lower the image recording density.

Notably, the printing section 11 includes four types of ink ribbons of cyan C, magenta M, yellow Y, and black K. The inks of these colors are transferred in a superimposed state so as to perform color printing.

Figure 2:
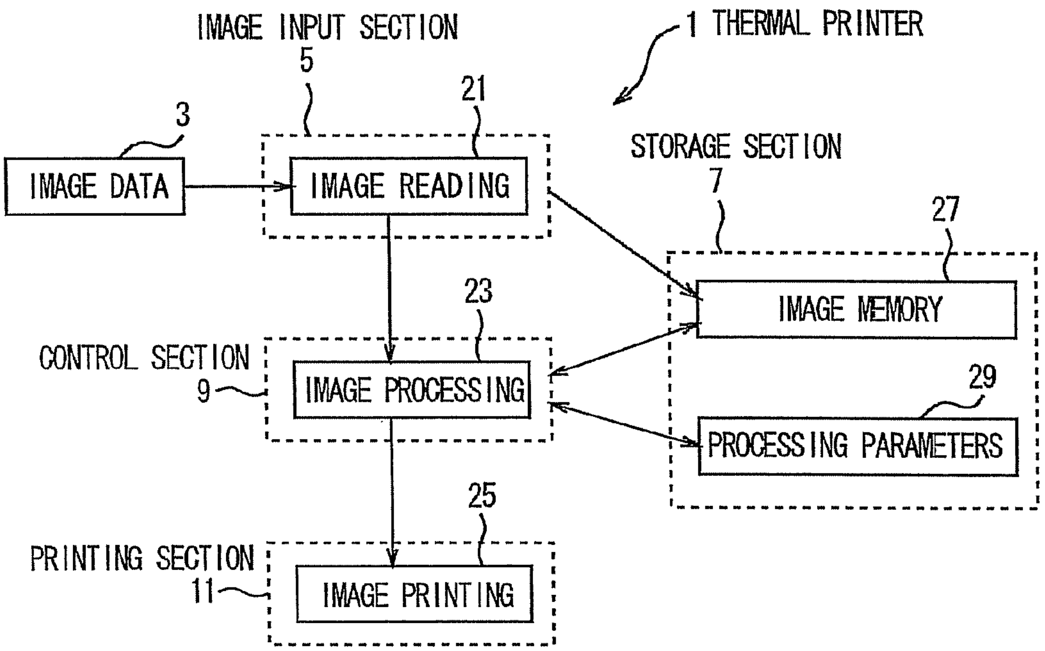
FIG. 2 Diagram showing the relation between the configuration of the thermal printer 1 and the details of processing.

FIG. 2 is a diagram showing the relation between the configuration of the thermal printer 1 of FIG. 1 and the details of processing.

The image input section 5 performs image reading 21 so as to read the image data 3. The image input section 5 stores the read image data into image memory 27 of the storage section 7, and simultaneously sends the image data to the control section 9. The control section 9 performs image processing 23 on the image data 3.

The memory section 7 is composed of the image memory 27 for storing image data to undergo image processing, and the processing parameter memory 29 for storing parameters used when the image processing is performed. Further, although not illustrated, the storage section 7 further stores a control program, and control parameters of the printing section 11 such as the thermal head.

Image data acquired by the thermal printer 1 and image data calculated in the course of the image processing 23 are registered in the image memory 27.

Notably, the original image and image data obtained in the course of calculation, excluding the final image data, are not necessarily required to be left in the image memory 27.

The processing parameter memory 29 of the storage section 7 stores parameters which are used by the image processing 23 for pattern formation, shift processing, polar coordinate conversion, heat-accumulation correction processing.

The control section 9 performs the image processing 23.

The image processing 23 includes various types of processing such as CMYK/RGB-gray conversion processing, gradation conversion processing, halftone conversion processing, pattern definition, horizontal hairline pattern formation, shift processing, rotation processing, polar coordinate conversion, and heat-accumulation correction processing. The image processing 23 performs image processing for the image data stored in the image memory 27 of the storage section 7 while using respective processing parameters stored in the processing parameter memory 29 to thereby obtain final image data. Image data produced in the course of the processing are stored in the image memory 27 of the storage section 7. The control section 9 sends the finally obtained image data to the printing section 11, which performs image printing 25.

Figure 3:
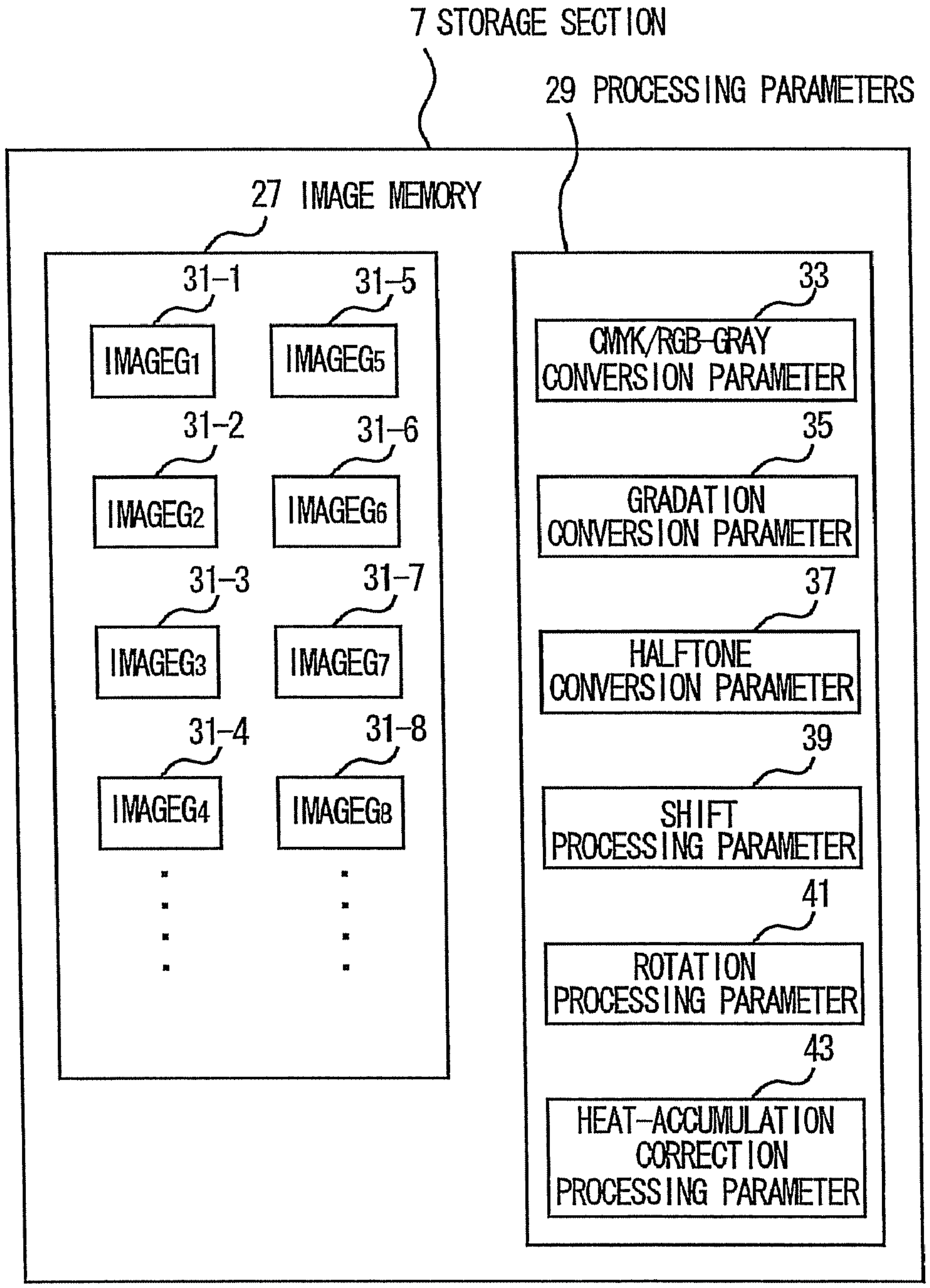
FIG. 3 Diagram showing the details of a storage section 7 of the thermal printer 1.

FIG. 3 is a diagram showing the details of the storage section 7 of the thermal printer 1. The memory section 7 is composed of the image memory 27 for storing image data to undergo image processing, and the processing parameter memory 29 for storing parameters used when the image processing is performed. Further, although not illustrated, the storage section 7 further stores a control program, and control parameters of the printing section 11 such as the thermal head.

The image data 3, which represent the original image acquired by the thermal printer 1, are registered in the image memory 27, as an image $G_1$ 31-1. Images $G_2$ 31-2, $G_3$ 31-3, $G_4$ 31-4, $G_5$ 31-5, $G_6$ 31-6, $G_7$ 31-7, $G_8$ 31-8, etc. are registered as image data calculated in the course of the image processing 23.

Notably, the image $G_1$ 31-1, which is the original image, and image data calculated in the course of calculation, excluding the images $G_7$ 31-7 and $G_8$ 31-8, which serve as final image data, are not required to be left in the image memory 27.

The processing parameter memory 29 of the storage section 7 stores a CMYK/RGB-gray conversion parameter 33, a gradation conversion parameter 35, a halftone conversion parameter 37, a shift processing parameter 39, a rotation processing parameter 41, a heat-accumulation correction processing parameter 43, etc., which are used by the image processing 23.

Flow of Image Processing)

Figure 4:
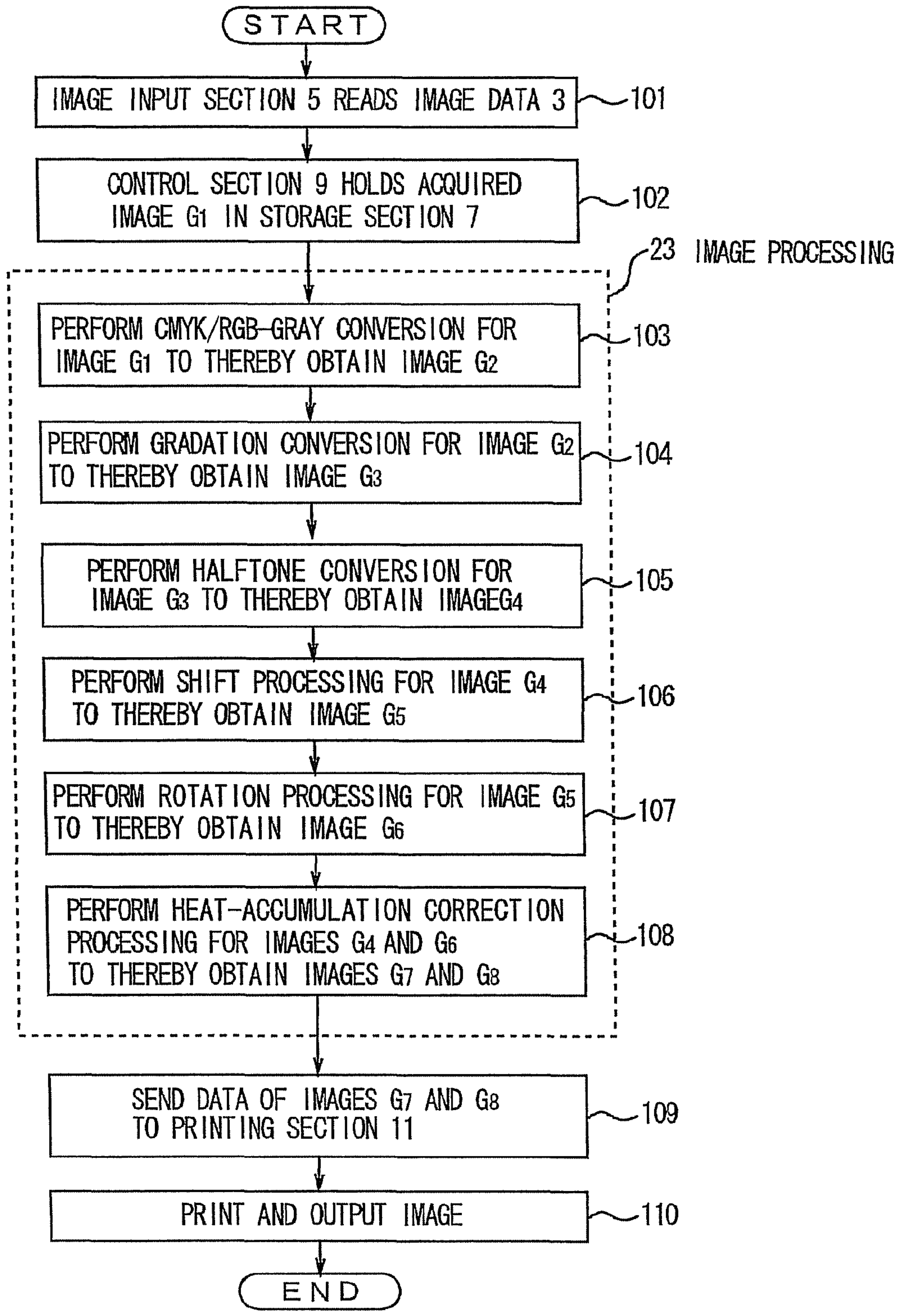
FIG. 4 Flowchart showing operation of image processing 23 according to a first embodiment.
Figure 5:
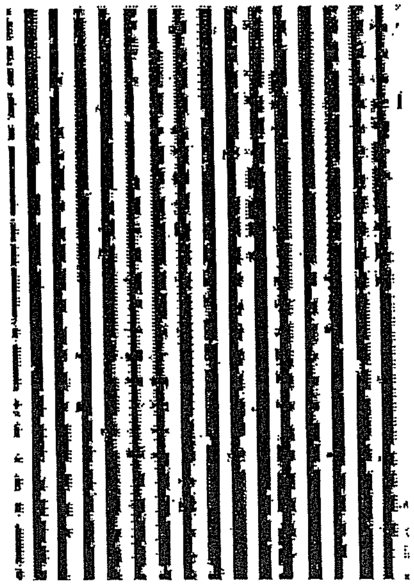
FIG. 5 Illustration showing an example output image in the case of gradation conversion of 100%.
Figure 6:
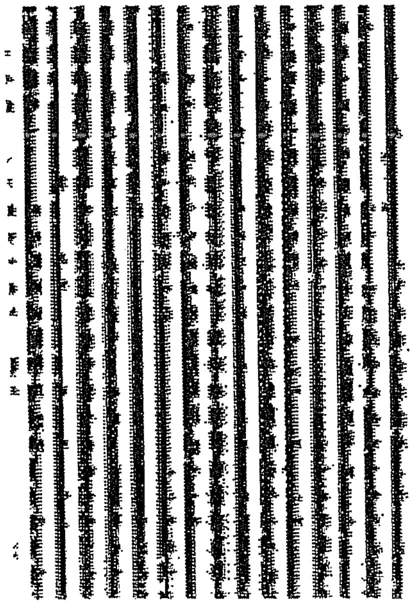
FIG. 6 Illustration showing an example output image in the case of gradation conversion of 80%.
Figure 7:
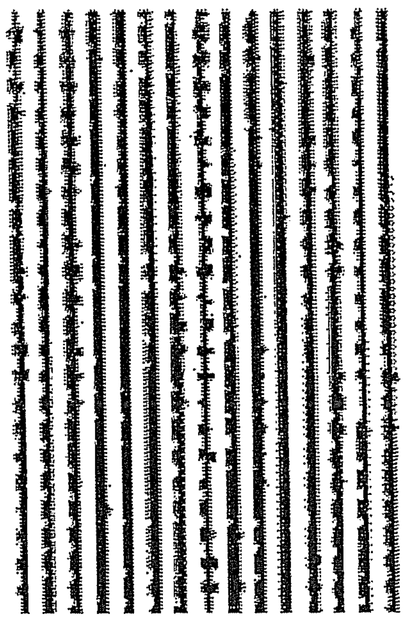
FIG. 7 Illustration showing an example output image in the case of gradation conversion of 65%.
Figure 8:
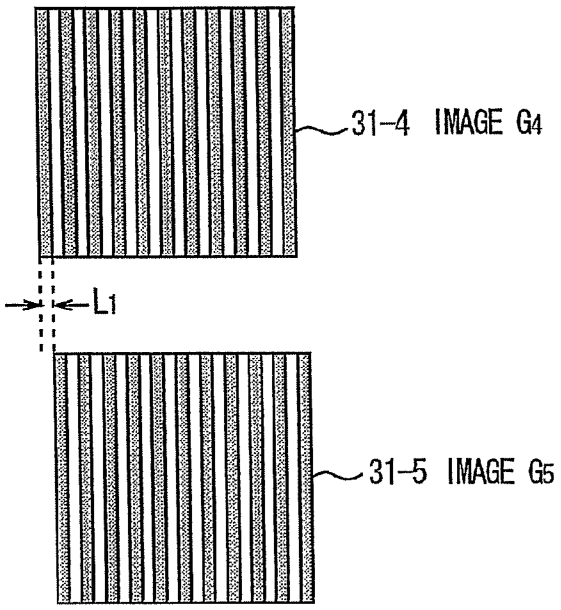
FIG. 8 Illustration used for explaining a method of generating an image $G_5$ 31-5 through lateral shift.
Figure 9:
FIG. 9 Illustration showing an example halftone-converted image of hairlines.
Figure 10:
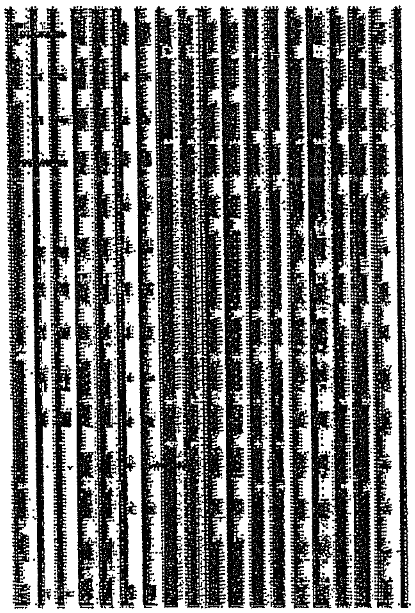
FIG. 10 Illustration showing an example halftone-converted image of hairlines having undergone shift processing.
Figure 11:
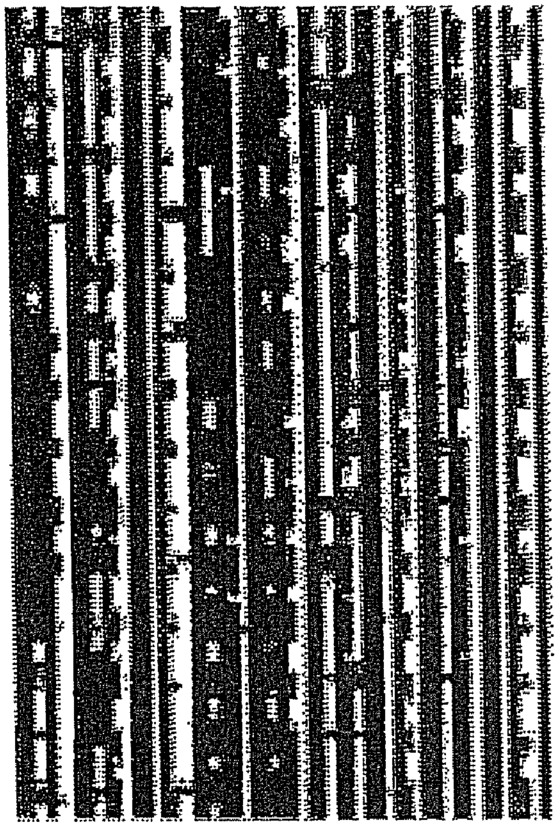
FIG. 11 Illustration showing an example halftone-converted image of hairlines having undergone shift processing and rotation processing.

Next, the flow of image processing in the thermal printer 1 will be described. FIG. 4 is a flowchart showing operation performed by the image processing 23 according to the first embodiment. FIG. 5 is an illustration showing an example output image in the case of gradation conversion of 100%. FIG. 6 is an illustration showing an example output image in the case of gradation conversion of 80%. FIG. 7 is an illustration showing an example output image in the case of gradation conversion of 65%. FIG. 8 is an illustration used for explaining a method of generating the image $G_5$ 31-5 through lateral shift. FIG. 9 is an illustration showing an example halftone-converted image of hairlines. FIG. 10 is an illustration showing an example halftone-converted image of hairlines having undergone the shift processing. FIG. 11 is an illustration showing an example halftone-converted image of hairlines having undergone the shift processing and the rotation processing.

The image input section 5 of the thermal printer reads the image data 3 (step 101); and the control section 9 holds the acquired image $G_1$ 31-1 in the image memory 27 of the storage section 7 (step 102).

Next, the control section 9 of the thermal printer 1 executes the image processing 23. That is, the control section 9 first converts the CMYK data or RGB data of the image $G_1$ 31-1 to gray data in accordance with the resolution of the thermal printer 1 to thereby produce the image $G_2$ 31-2 (step 103), and stores it in the image memory 27 of the storage section 7.

The control section 9 of the thermal printer 1 performs the gradation conversion; i.e., converts the gradation of the image $G_2$ 31-2 to thereby produce the image $G_3$ 31-3 (step 104), and stores it in the image memory 27 of the storage section 7.

In order to form thin and finer hairlines, the control section 9 performs gradation conversion of about 65% when the resolution of the thermal printer 1 is 600 dpi (dots per inch).

As shown in FIGS. 5, 6, and 7, an output image formed through the 65% gradation conversion provides hairlines thinner and finer than those provided by an output image formed through 100% gradation conversion and those provided by an output image formed through 80% gradation conversion.

The control section 9 of the thermal printer 1 performs halftone processing for the image $G_3$ 31-3 obtained through gradation conversion, to thereby produce the image $G_4$ 31-4 (step 105).

Here, it is assumed that image data express the C, M, Y, K components with the same angle, for example, image data are of a line screen type (intersection angle: 90°).

The matrix size of each halftone dot varies depending on the resolution of the thermal printer 1 and the number of lines. For example, when the resolution of the thermal printer 1 is 600 dpi, the matrix size is 10×10 pixels for the case where the number of lines is 60 lpi (lines per inch), 8×8 pixels for the case where the number of lines is 75 lpi, 6×6 pixels for the case where the number of lines is 100 lpi, and 5×5 pixels for the case where the number of lines is 120 lpi.

The control section 9 of the thermal printer 1 then performs shift processing for the image $G_4$ 31-4 obtained through the halftone processing, to thereby produce the image $G_5$ 31-5 (step 106).

As shown in FIG. 8, the direction of the shift processing is the rightward direction only, and the number of pixels L1 by which the image is shifted varies depending on the number of lines of the halftone dot.

For example, when the resolution of the thermal printer 1 is 600 dpi, L1 is three pixels for the case where the number of lines of the halftone dot is 100 lpi, L1 is four pixels for the case where the number of lines is 75 lpi, L1 is five pixels for the case where the number of lines is 60 lpi, and L1 is two pixels for the case where the number of lines is 120 lpi.

After the shift processing, the control section 9 of the thermal printer 1 performs rotation processing for the image $G_5$ 31-5, to thereby produce the image $G_6$ 31-6 (step 107).

In the rotation processing, the control section 9 rotates the image $G_5$ 31-5 by 180 degrees.

The control section 9 of the thermal printer 1 performs heat-accumulation correction processing for the images $G_4$ 31-4 and $G_6$ 31-6, to thereby produce the images $G_7$ 31-7 and $G_8$ 31-8 (step 108).

The control section 9 of the thermal printer 1 ends the step of the image processing 23 and sends the images $G_7$ 31-7 and $G_8$ 31-8 to the printing section 11 as final image data (step 109).

In accordance with an instruction from the control section 9, the printing section 11 prints and outputs the images $G_7$ 31-7 and $G_8$ 31-8 as an output image 15 (step 110).

Since a first image and a second image obtained by shifting and rotating the first image are printed in a superimposed state, a halftone-converted image of hairlines can be made finer.

By superimposing, on a hairline halftone-converted image shown in FIG. 9, an image obtaining by shifting the hairline halftone-converted image, a finer halftone-converted image of hairlines is produced as shown in FIG. 10. Further, by superimposing, on the hairline halftone-converted image shown in FIG. 9, an image obtaining by shifting and rotating the hairline halftone-converted image, a halftone-converted image of hairlines which is finer and more random is produced as shown in FIG. 11.

As described above, according to the present embodiment, there can be provided a thermal recording apparatus or the like which reduces effects of heat accumulated in a thermal head and prints highly fine hairline images and circular hairlines by a low resolution.

Second Embodiment

Next, a second preferred embodiment of the thermal recording apparatus of the present invention will be described.

In the second embodiment, the structure and the processing details of the thermal printer 1 are generally the same as those in the first embodiment shown in FIGS. 1 and 2.

In the second embodiment, a horizontal hairline pattern is formed after the pattern definition; the shift processing is performed for the horizontal hairline pattern, whereby another horizontal hairline pattern is produced; the two horizontal hairline patterns are subjected to the polar coordinate conversion and the heat-accumulation correction processing; and two circular hairline images are printed in a superimposed state.

Figure 12:
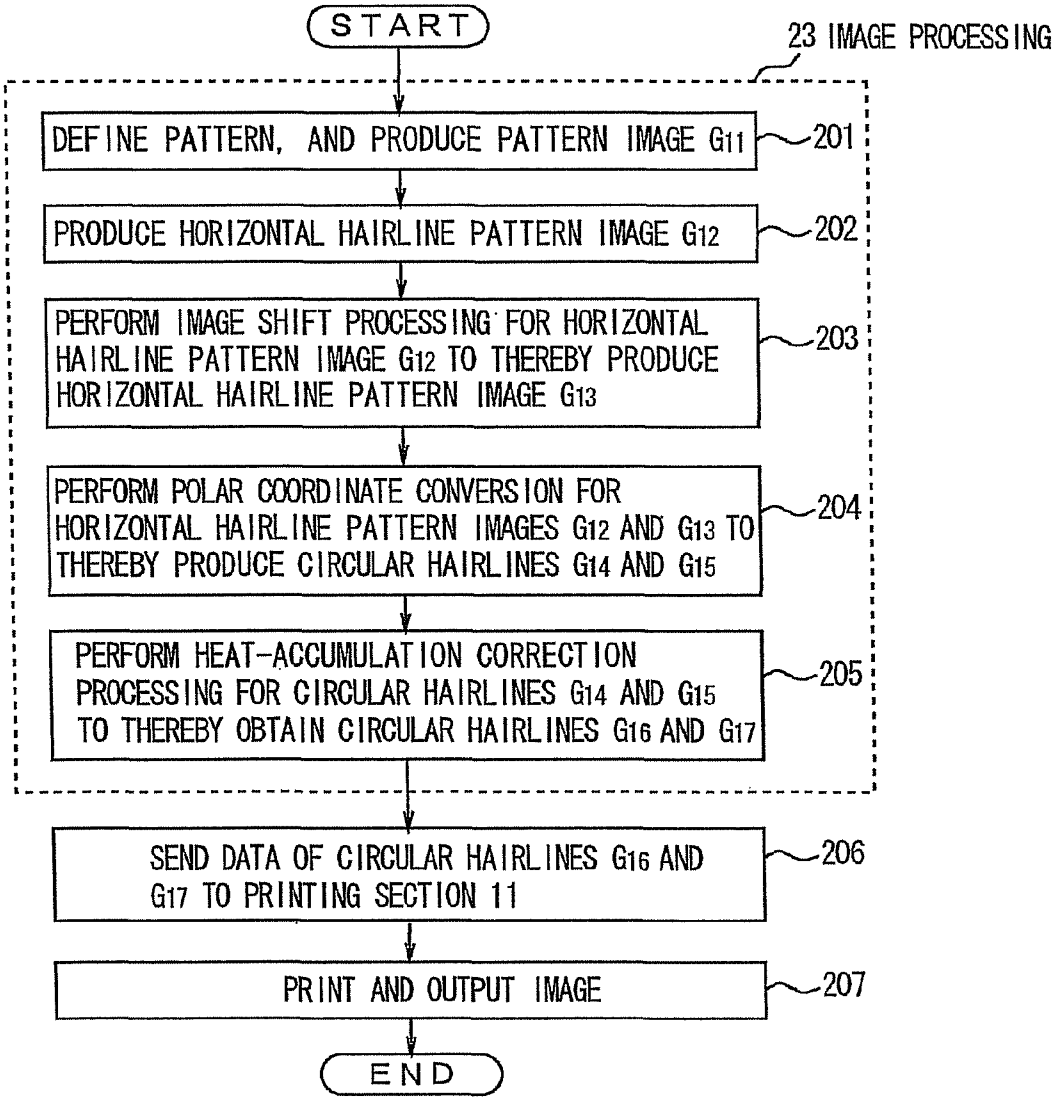
FIG. 12 Flowchart showing the flow of processing of the image processing 23 according to the first embodiment.
Figure 13:
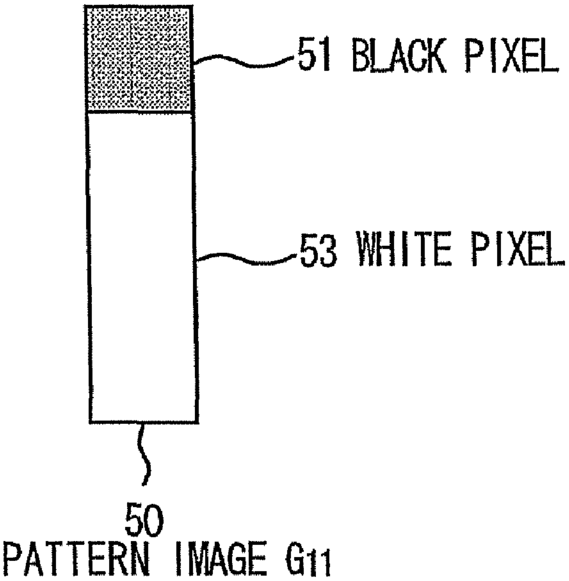
FIG. 13 Illustration showing an example pattern image $G_{11}$
Figure 14:
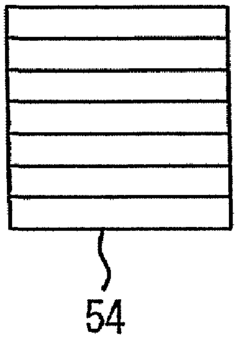
FIG. 14 Illustration showing an example horizontal hairline pattern $G_{12}$ 54.
Figure 15:
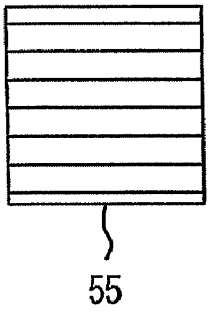
FIG. 15 Illustration showing an example horizontal hairline pattern $G_{13}$ 55 having undergone shift processing.
Figure 16:
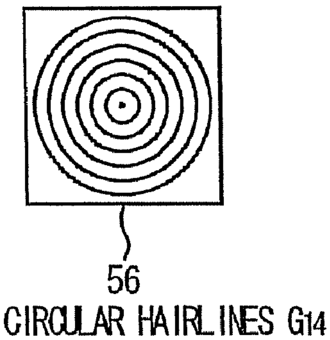
FIG. 16 Illustration showing an example circular hairline $G_{14}$ 56.
Figure 17:
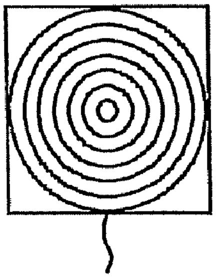
FIG. 17 Illustration showing an example circular hairline $G_{15}$ 57 having undergone shift processing.
Figure 18:
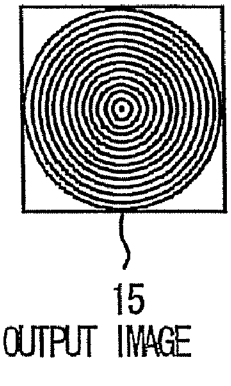
FIG. 18 Illustration showing an example output image 15.

In the following, the flow of processing of forming circular hairlines through pattern definition will be described. FIG. 12 is a flowchart showing the flow of processing of the image processing 23 according to the second embodiment. FIG. 13 is an illustration showing an example pattern image $G_{11}$ 50. FIG. 14 is an illustration showing an example horizontal hairline pattern $G_{12}$ 54. FIG. 15 is an illustration showing an example horizontal hairline pattern $G_{13}$ 55 having undergone shift processing. FIG. 16 is an illustration showing an example circular hairline $G_{14}$ 56. FIG. 17 is an illustration showing an example circular hairline $G_{15}$ 57 having undergone shift processing. FIG. 18 is an illustration showing an example output image 15.

The control section 9 of the thermal printer 1 performs the image processing 23 so as to perform pattern definition of circular hairlines and produce a pattern image $G_{11}$ 50 (step 201).

As shown in FIG. 13, the pattern image $G_{11}$ 50 is composed of black pixels 51 and white pixels 53. By changing the numbers of the black pixels 51 and the white pixels 53, circular hairlines of various widths can be generated. In the present embodiment, the number of the black pixels 51 is 3, and the number of the white pixels 53 is 19.

Next, the control section 9 of the thermal printer 1 produces from the pattern image $G_{11}$ 50 a horizontal hairline pattern $G_{12}$ 54 shown in FIG. 14 and composed of 3 black pixels and 19 while pixels (step 202).

Further, the control section 9 of the thermal printer 1 shifts the horizontal hairline pattern $G_{12}$ 54 downward by 11 pixels, to thereby produce a horizontal hairline pattern $G_{13}$ 55 shown (step 203).

The control section 9 of the thermal printer 1 performs polar coordinate conversion for the horizontal hairline patterns $G_{12}$ 54 and $G_{13}$ 55, to thereby produce circular hairlines $G_{14}$ 56 and $G_{15}$ 57 shown in FIGS. 16 and 17, respectively (step 204).

Although various methods, such as a nearest neighbor interpolation method, a bilinear interpolation method, and a cubic interpolation method, exist as image interpolation methods for producing circular hairlines, the nearest neighbor interpolation method can reduce moiré to the greatest degree.

After production of the circular hairlines, the control section 9 of the thermal printer 1 performs heat-accumulation correction processing for the circular hairlines $G_{14}$ 56 and $G_{15}$ 57, to thereby produce circular hairlines $G_{16}$ and $G_{17}$ (step 205).

The control section 9 of the thermal printer 1 ends the step of the image processing 23 and sends the circular hairlines $G_{16}$ and $G_{17}$ to the printing section 11 as final image data (step 206).

The printing section 11 prints and outputs the circular hairlines $G_{16}$ and $G_{17}$ as an output image 15 in accordance with an instruction from the control section 9 (step 207).

FIG. 18 shows the printed output image 15 including the circular hairlines.

Since a first image and a second image obtained by shifting the first image are printed in a superimposed state, moiré is reduced, and finer circular hairlines can be formed.

Next, examples of the printed circular hairlines will be described with reference to FIGS. 19, 20, 21, 22, 23, 24, 25, and 26.

Figure 19:
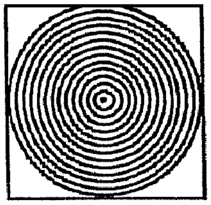
FIG. 19 Illustration showing an example printed image 1 of circular hairlines.
Figure 20:
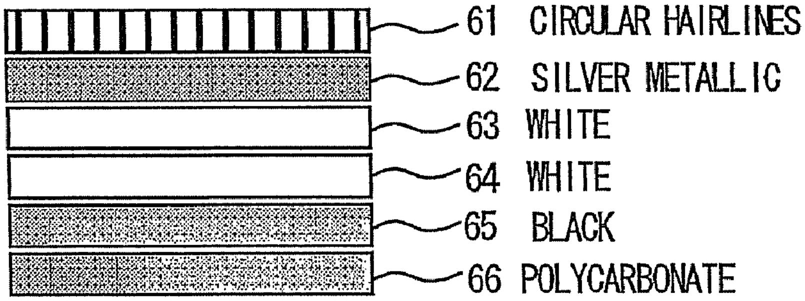
FIG. 20 Illustration showing the layer structure of the example printed image 1 of circular hairlines.
Figure 21:
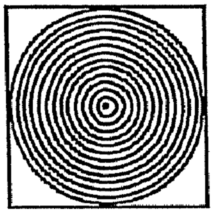
FIG. 21 Illustration showing an example printed image 2 of circular hairlines.
Figure 22:
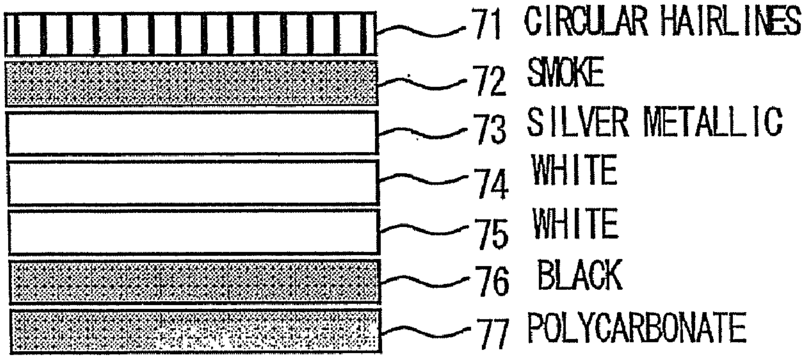
FIG. 22 Illustration showing the layer structure of the example printed image 2 of circular hairlines.
Figure 23:
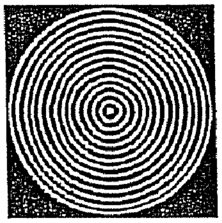
FIG. 23 Illustration showing an example printed image 3 of circular hairlines.
Figure 24:
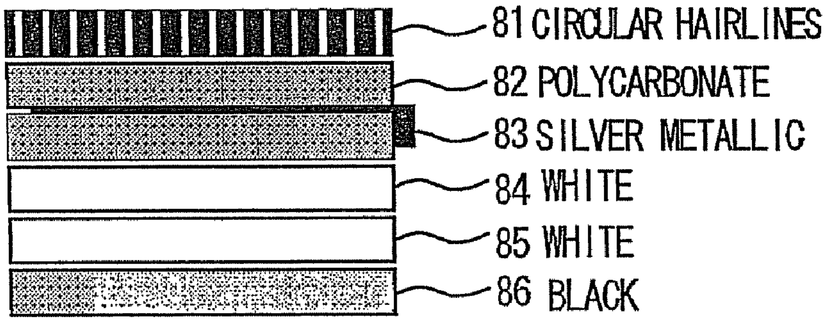
FIG. 24 Illustration showing the layer structure of the example printed image 3 of circular hairlines.
Figure 25:
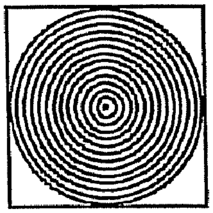
FIG. 25 Illustration showing an example printed image 4 of circular hairlines.
Figure 26:
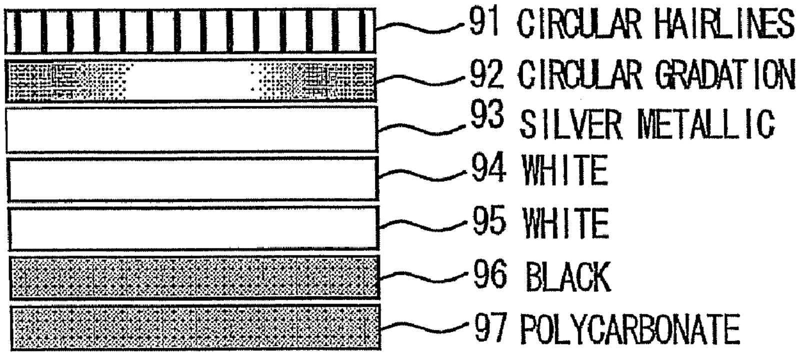
FIG. 26 Illustration showing the layer structure of the example printed image 4 of circular hairlines.

FIG. 19 is an illustration showing an example printed image 1 of circular hairlines. FIG. 20 is an illustration showing the layer structure of the example printed image 1 of circular hairlines. FIG. 21 is an illustration showing an example printed image 2 of circular hairlines. FIG. 22 is an illustration showing the layer structure of the example printed image 2 of circular hairlines. FIG. 23 is an illustration showing an example printed image 3 of circular hairlines. FIG. 24 is an illustration showing the layer structure of the example printed image 3 of circular hairlines. FIG. 25 is an illustration showing an example printed image 4 of circular hairlines. FIG. 26 is an illustration showing the layer structure of the example printed image 4 of circular hairlines.

As shown in FIG. 20, the example printed image 1 of circular hairlines shown in FIG. 19 has a layer structure in which, after circular hairlines 61 are printed on an intermediate transfer film (not shown), a silver metallic layer 62, white layers 63 and 64 for increasing brightness, and a black layer 65 are printed thereon, and the circular hairlines 61 and the layers are transferred to a polycarbonate film 66.

As shown in FIG. 22, the example printed image 2 of circular hairlines shown in FIG. 21 has a layer structure in which, after smoke circular hairlines 71 are printed on an intermediate transfer film (not shown), a smoke layer 72 for suppressing glossiness, a silver metallic layer 73, white layers 74 and 75, and a black layer 76 are printed thereon, and the circular hairlines 71 and the layers are transferred to a polycarbonate film 77.

As shown in FIG. 24, the example printed image 3 of circular hairlines shown in FIG. 23 has a layer structure in which, in order to emphasize the 3D impression, black circular hairlines 81 are printed on a polycarbonate film 82, and a silver metallic layer 83, white layers 84 and 85, and a black layer 86 are printed thereon.

As shown in FIG. 26, the example printed image 4 of circular hairlines shown in FIG. 25 has a layer structure in which, after smoke circular hairlines 91 are printed on an intermediate transfer film (not shown), a circular gradation layer 92 of cyan, a silver metallic layer 93, white layers 94 and 95, and a black layer 96 are printed thereon, and the circular hairlines 91 and the layers are transferred to a polycarbonate film 97. Positioning of the circular hairlines and the circular gradation layer 92 can be performed easily.

As described above, according to the present embodiment, there can be provided a thermal recording apparatus or the like which reduces effects of heat accumulated in a thermal head and prints highly fine hairline images and circular hairlines by a low resolution.

In the present embodiment, a horizontal hairline pattern is formed after the pattern definition; the shift processing is performed for the horizontal hairline pattern, whereby another horizontal hairline pattern is produced; the two horizontal hairline patterns are subjected to the polar coordinate conversion and the heat-accumulation correction processing; and two circular hairline images are printed in a superimposed state. However, the present embodiment may be modified such that the polar coordinate conversion and the heat-accumulation correction processing are performed for a single horizontal hairline pattern formed from the pattern definition, and circular hairlines are printed.

Further, circular hairlines having various widths can be readily printed by changing the numbers of black and white pixels used in the pattern definition.

Third Embodiment

Next, a third preferred embodiment of the thermal recording apparatus of the present invention will be described.

In the third embodiment, the structure and the processing details of the thermal printer 1 are generally the same as those in the first embodiment shown in FIGS. 1 and 2.

In the third embodiment, the flow of the image processing 23 of the second embodiment is partially changed to produce circular hairlines by performing polar coordinate conversion for a hairline image obtained from the input image 3 through CMYK/RGB-gray conversion, gradation conversion, and halftone conversion.

Figure 27:
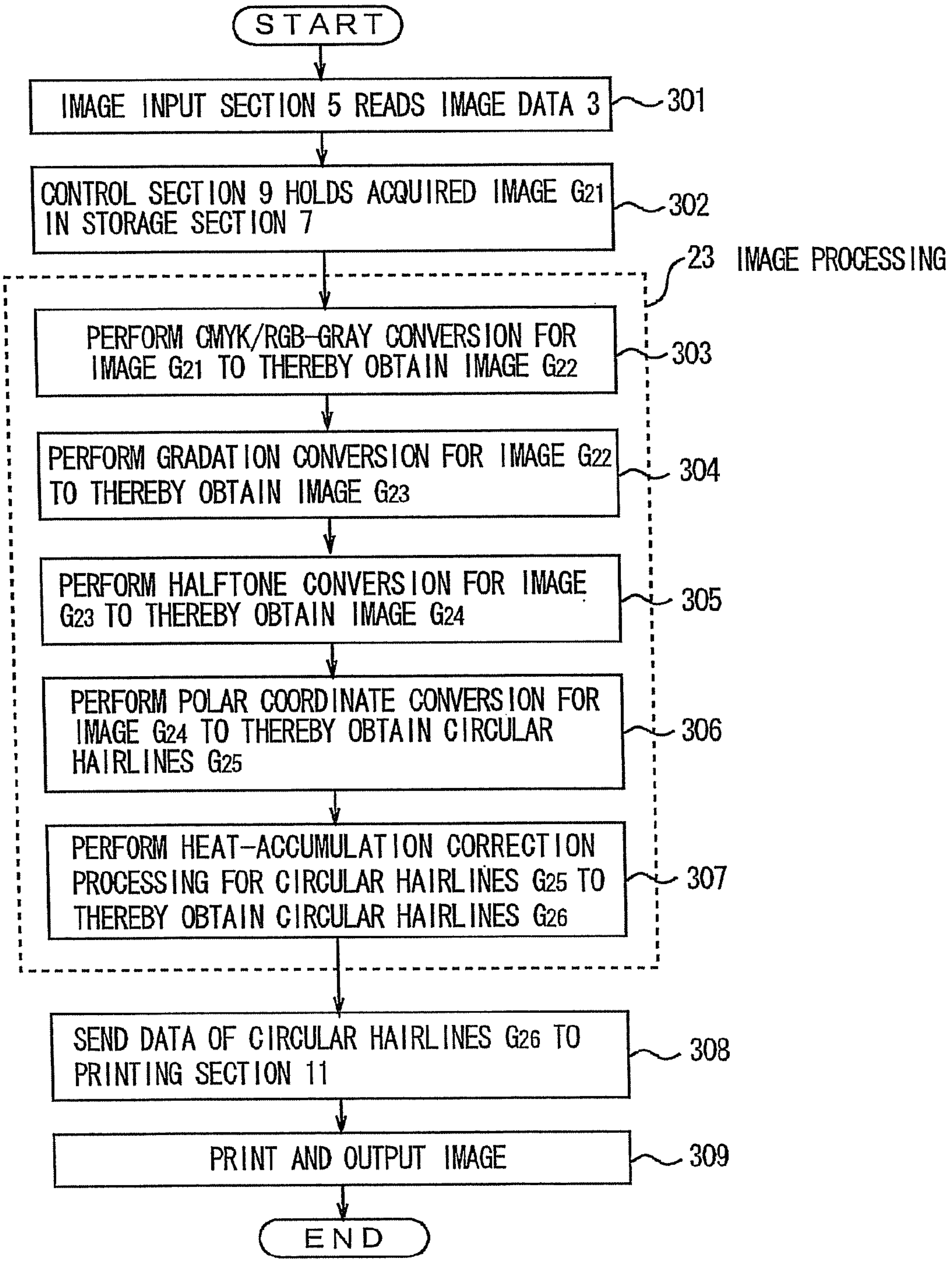
FIG. 27 Flowchart showing the flow of processing of the image processing 23 according to a second embodiment.

In the following, the flow of processing for producing circular hairlines from an input image will be described. FIG. 27 is a flowchart showing the flow of processing of the image processing 23 according to the third embodiment.

The image input section 5 of the thermal printer reads the image data 3 (step 301); and the control section 9 holds an acquired image $G_{21}$ in the image memory 27 of the storage section 7 (step 302).

Next, the control section 9 of the thermal printer 1 executes the image processing 23. That is, the control section 9 first converts the CMYK data or RGB data of the image $G_{21}$ to gray data in accordance with the resolution of the thermal printer 1 to thereby produce an image $G_{22}$ (step 303), and stores it in the image memory 27 of the storage section 7.

The control section 9 of the thermal printer 1 performs the gradation conversion; i.e., converts the gradation of the image $G_{22}$ to thereby produce an image $G_{23}$ (step 304), and stores it in the image memory 27 of the storage section 7.

In order to form thin and finer hairlines, the control section 9 performs gradation conversion of about 65% when the resolution of the thermal printer 1 is 600 dpi (dots per inch).

As shown in FIGS. 5, 6, and 7, an output image formed through the 65% gradation conversion provides hairlines thinner and finer than those provided by an output image formed through 100% gradation conversion and those provided by an output image formed through 80% gradation conversion.

The control section 9 of the thermal printer 1 performs halftone processing for the image $G_{23}$ obtained through gradation conversion, to thereby produce an image $G_{24}$ (step 305).

Here, it is assumed that image data express the C, M, Y, K components with the same angle, for example, image data are of a line screen type (intersection angle: 90°).

The matrix size of each halftone dot varies depending on the resolution of the thermal printer 1 and the number of lines. For example, when the resolution of the thermal printer 1 is 600 dpi, the matrix size is 10×10 pixels for the case where the number of lines is 60 lpi (lines per inch), 8×8 pixels for the case where the number of lines is 75 lpi, 6×6 pixels for the case where the number of lines is 100 lpi, and 5×5 pixels for the case where the number of lines is 120 lpi.

The control section 9 of the thermal printer 1 then performs polar coordinate conversion for the image $G_{24}$ obtained through the halftone processing, to thereby produce circular hairlines $G_{25}$ (step 306).

After the production of circular hairlines, the control section 9 of the thermal printer 1 performs heat-accumulation correction processing for the circular hairlines $G_{25}$, to thereby produce circular hairlines $G_{26}$ (step 307).

The control section 9 of the thermal printer 1 ends the step of the image processing 23 and sends the circular hairlines $G_{26}$ to the printing section 11 as final image data (step 308).

The printing section 11 prints and outputs the circular hairlines $G_{26}$ as an output image 15 in accordance with an instruction from the control section 9 (step 309).

In the above-described third preferred embodiment, polar coordinate conversion is performed for a hairline image obtained from the input image 3 through CMYK/RGB-gray conversion, gradation conversion, and halftone conversion, whereby fine circular hairlines are produced.

Preferred embodiments of the thermal recording apparatus according to the present invention have been described with reference to the accompanying drawings. However, the present invention is not limited to the above-described embodiments. It is clear that a person with ordinary skill in the art can easily conceive various modifications and changes within the technical idea described in the claims, and it is contemplated that such modifications and changes naturally fall within the technical scope of the present invention.

The invention claimed is:

1. A printed matter obtained by:

performing shift processing for second image data, which are obtained from first image data through gradation conversion performed in accordance with a resolution and halftone processing, to thereby produce third image data;

performing rotation processing for said third image data to thereby produce fourth image data;

performing heat-accumulation correction processing for said second image data and said fourth image data to thereby produce fifth image data and sixth image data; and printing said fifth image data and said sixth image data in a superimposed state on an object to be printed by a thermal recording apparatus including a thermal head.

2. A printed matter according to claim 1, wherein said rotation processing rotates said third image data by 180 degrees.

3. A thermal recording apparatus comprising:

means for performing shift processing for second image data, which are obtained from first image data through gradation conversion performed in accordance with a resolution and halftone processing, to thereby produce third image data;

means for performing rotation processing for said third image data to thereby produce fourth image data;

means for performing heat-accumulation correction processing for said second image data and said fourth image data to thereby produce fifth image data and sixth image data; and means for printing said fifth image data and said sixth image data in a superimposed state on an object to be printed.

4. A thermal recording apparatus according to claim 3, wherein said rotation processing rotates said third image data by 180 degrees.

5. An image forming method comprising the steps of:

performing shift processing for second image data, which are obtained from first image data through gradation conversion performed in accordance with a resolution and halftone processing, to thereby produce third image data;

performing rotation processing for said third image data to thereby produce fourth image data;

performing heat-accumulation correction processing for said second image data and said fourth image data to thereby produce fifth image data and sixth image data; and printing said fifth image data and said sixth image data in a superimposed state on an object to be printed by a thermal recording apparatus including a thermal head.

6. An image forming method according to claim 5, wherein said rotation processing rotates said third image data by 180 degrees.

7. A printed matter obtained by:

producing first image data for forming a pattern;

producing, from said first image data, second image data for forming a horizontal hairline pattern;

performing shift processing for said second image data to thereby produce third image data;

performing polar coordinate conversion for said second image data and said third image data to thereby produce fourth image data and fifth image data;

performing heat-accumulation correction processing for said fourth image data and said fifth image data to thereby produce sixth image data and seventh image data; and printing said sixth image data and said seventh image data in a superimposed state on an object to be printed by a thermal recording apparatus including a thermal head.

8. A printed matter according to claim 7, wherein a circular hairline is printed on the object to be printed.

9. A printed matter according to claim 7, wherein a line width can be changed by changing said pattern.

10. A thermal recording apparatus comprising:

means for producing first image data for forming a pattern;

means for producing, from said first image data, second image data for forming a horizontal hairline pattern;

means for performing shift processing for said second image data to thereby produce third image data;

means for performing polar coordinate conversion for said second image data and said third image data to thereby produce fourth image data and fifth image data;

means for performing heat-accumulation correction processing for said fourth image data and said fifth image data to thereby produce sixth image data and seventh image data; and means for printing said sixth image data and said seventh image data in a superimposed state on an object to be printed.

11. A thermal recording apparatus according to claim 10, wherein a circular hairline is printed on the object to be printed.

12. A thermal recording apparatus according to claim 10, wherein a width of said circular hairline can be changed by changing said pattern.

13. An image forming method comprising the steps of producing first image data for forming a pattern;

producing, from said first image data, second image data for forming a horizontal hairline pattern;

performing shift processing for said second image data to thereby produce third image data;

performing polar coordinate conversion for said second image data and said third image data to thereby produce fourth image data and fifth image data;

performing heat-accumulation correction processing for said fourth image data and said fifth image data to thereby produce sixth image data and seventh image data; and printing said sixth image data and said seventh image data in a superimposed state on an object to be printed by a thermal recording apparatus including a thermal head.

14. An image forming method according to claim 13, wherein a circular hairline is printed on the object to be printed.

15. An image forming method according to claim 13, wherein a width of said circular hairline can be changed by changing said pattern.

16. A printed matter obtained by:

producing first image data for forming a pattern;

producing, from said first image data, second image data for forming a horizontal hairline pattern;

performing polar coordinate conversion for said second image data to thereby produce third image data;

performing heat-accumulation correction processing for said third image data to thereby produce fourth image data; and printing said fourth image data on an object to be printed by a thermal recording apparatus including a thermal head.

17. A printed matter according to claim 16, wherein a circular hairline is printed on the object to be printed.

18. A printed matter according to claim 16, wherein a line width can be changed by changing said pattern.

19. A thermal recording apparatus comprising:

means for producing first image data for forming a pattern;

means for producing, from said first image data, second image data for forming a horizontal hairline pattern;

means for performing polar coordinate conversion for said second image data to thereby produce third image data;

means for performing heat-accumulation correction processing for said third image data to thereby produce fourth image data; and means for printing said fourth image data on an object to be printed.

20. A thermal recording apparatus according to claim 19, wherein a circular hairline is printed on the object to be printed.

21. A thermal recording apparatus according to claim 19, wherein a width of said circular hairline can be changed by changing said pattern.

22. An image forming method comprising the steps of:

producing first image data for forming a pattern;

producing, from said first image data, second image data for forming a horizontal hairline pattern;

performing polar coordinate conversion for said second image data to thereby produce third image data;

performing heat-accumulation correction processing for said third image data to thereby produce fourth image data; and printing said fourth image data on an object to be printed by a thermal recording apparatus including a thermal head.

23. An image forming method according to claim 22, wherein a circular hairline is printed on the object to be printed.

24. An image forming method according to claim 22, wherein a width of said circular hairline can be changed by changing said pattern.

25. A printed matter obtained by:

performing polar coordinate conversion for second image data, which are obtained from first image data through gradation conversion performed in accordance with a resolution and halftone processing, to thereby produce third image data;

performing heat-accumulation correction processing for said third image data to thereby produce fourth image data; and printing said fourth image data on an object to be printed by a thermal recording apparatus including a thermal head.

26. A thermal recording apparatus comprising:

means for performing polar coordinate conversion for second image data, which are obtained from first image data through gradation conversion performed in accordance with a resolution and halftone processing, to thereby produce third image data;

means for performing heat-accumulation correction processing for said third image data to thereby produce fourth image data; and means for printing said fourth image data on an object to be printed.

27. An image forming method comprising the steps of:

performing polar coordinate conversion for second image data, which are obtained from first image data through gradation conversion performed in accordance with a resolution and halftone processing, to thereby produce third image data;

performing heat-accumulation correction processing for said third image data to thereby produce fourth image data; and printing said fourth image data on an object to be printed by a thermal recording apparatus including a thermal head.

* * * * *